(12) United States Patent  (10) Patent No.: US 8,558,835 B2
Keller et al.  (45) Date of Patent: Oct. 15, 2013

(54) SYSTEM, METHOD, AND COMPUTER PROGRAM PRODUCT FOR CONSISTENT IMAGE SYNTHESIS

(75) Inventors: Alexander Keller, Berlin (DE); Carsten A. Wächter, Berlin (DE); Michael R. Kaplan, Santa Cruz, CA (US)

(73) Assignee: NVIDA Corporation, Santa Clara, CA (US)

( * ) Notice: Subject to any disclaimer, the term of this patent is extended or adjusted under 35 U.S.C. 154(b) by 1108 days.

(21) Appl. No.: 12/512,782

(22) Filed: Jul. 30, 2009

(65) Prior Publication Data

US 2011/0025682 A1    Feb. 3, 2011

(51) Int. Cl.
*G06T 17/00*    (2006.01)
*G06T 15/00*    (2011.01)

(52) U.S. Cl.
USPC .......................................... 345/424; 345/419

(58) Field of Classification Search
USPC ................................................ 345/419, 424
See application file for complete search history.

(56) References Cited

U.S. PATENT DOCUMENTS

| | | | |
|---|---|---|---|
| 7,425,959 B2 * | 9/2008 | Guenter | 345/442 |
| 8,266,623 B2 | 9/2012 | Keller et al. | |
| 2009/0141026 A1 | 6/2009 | Raab et al. | |
| 2010/0281480 A1 | 11/2010 | Keller et al. | |

OTHER PUBLICATIONS

Csébfalvi et al., "Monte Carlo Volume Rendering", IEEE Visualization 2003, pp. 449-456, 2003.*
Keller, A., "Instant Radiosity", Proceedings of the 24th Annual Conference on Computer Graphics and interactive Techniques. 1997.*
Keller, A., "A Quasi-Monte Carlo Algorithm for the Global illumination Problem in the Radiosity Setting", In H. Niederreiter and R Shiue, editors, Monte Carlo and Quasi-Monte Carlo Methods in Scientific Computer, vol. 106, Spring, 1995.*
U.S. Appl. No. 12/241,928, filed Sep. 30, 2008.
U.S. Appl. No. 12/432,498, filed Apr. 29, 2009.
Clarberg et al., "Wavelet Importance Sampling: Efficiently Evaluating Products of Complex Functions," Proceedings of ACM SIGGRAPH 2005, ACM Press, Jul. 2005, pp. 1166-1175.
Schürer, "Adaptive Quasi-Monte Carlo Integration Based on MISER and VEGAS," Monte Carlo and Quasi-Monte Carlo Methods 2002 (H. Niederreiter, ed.), Springer, 2004, pp. 393-406.
Secord et al., "Fast Primitive Distribution for Illustration," 13$^{th}$Eurographics Workshop on Rendering, 2002, pp. 215-226.

(Continued)

*Primary Examiner* — Jeffrey Chow
(74) *Attorney, Agent, or Firm* — Zilka-Kotab, PC

(57) ABSTRACT

A system, method, and computer program product are provided for focusing computing power to a region of interest that can be changed interactively and arbitrarily during the process of image synthesis. In operation, a problem domain is partitioned utilizing a first selected technique. Additionally, a number of samples to be drawn per partition are assigned utilizing a second selected technique. Furthermore, the assigned number of samples are drawn for each partition, where the samples are generated by only one deterministic sample sequence. Still yet, the partitioning, assigning, and drawing are capable of being repeated such that existing partitions and assignments are capable of remaining unchanged during sampling and a convergence speed is adapted without compromising convergence in at least one of a sequential computing environment or a parallel computing environment. In this way, the convergence of image synthesis is not compromised. In fact, the image synthesis process may converge to the same solution that would have been obtained without interaction.

28 Claims, 4 Drawing Sheets

(56) References Cited

OTHER PUBLICATIONS

Dembeck, D. C. et al., "Digitally Shifted Sobol' Sequences for Adaptive Integration," 2004, Abstract.

Dammertz, H. et al., "A Hierarchical Automatic Stopping Condition for Monte Carlo Global Illumination," 18th International Conference in Central Europe on Computer Graphics, Visualization and Computer Vision, WSCG 2010, 2010, pp. 159-164.

Keller, A., "Myths of Computer Graphics," Monte Carlo and Quasi-Monte Carlo Methods 2004, 2006, pp. 217-243.

Press, W. H. et al., "Numerical Recipes in C: The Art of Scientific Computing," Cambridge University Press, Second Edition, 1992, pp. 1-994.

Schwarz, H. R. et al., "Numerische Mathematik," 6. Auflage, Oct. 2006, pp. 1-574.

Niederreiter, H., "Random Number Generation and Quasi-Monte Carlo Methods," Society for Industrial and Applied Mathematics, 1992, pp. 1-241.

\* cited by examiner

SYSTEM, METHOD, AND COMPUTER PROGRAM PRODUCT FOR CONSISTENT IMAGE SYNTHESIS

FIELD OF THE INVENTION

The present invention relates to image synthesis, and more particularly to concentrating computing power according to interest without compromising the convergence of the image synthesis procedure.

BACKGROUND

Previously, focusing the process of image synthesis to a region of interest did not allow the continuation of the image generation process in a consistent manner when changing the region of interest interactively, for example. There is thus a need for addressing these and/or other issues associated with the prior art.

SUMMARY

A system, method, and computer program product are provided for focusing computing power to a region of interest that can be changed interactively and arbitrarily during the process of image synthesis. In operation, a problem domain is partitioned utilizing a first selected technique. Additionally, a number of samples to be drawn per partition are assigned utilizing a second selected technique. Furthermore, the assigned number of samples are drawn for each partition, where the samples are generated by only one deterministic sample sequence. Still yet the partitioning, assigning, and drawing are capable of being repeated such that existing partitions and assignments are capable of remaining unchanged during sampling and a convergence speed is adapted without compromising convergence in at least one of a sequential computing environment or a parallel computing environment. In this way, the convergence of image synthesis is not compromised. In fact, the image synthesis process may converge to the same solution that would have been obtained without interaction.

DETAILED DESCRIPTION

Figure 1:
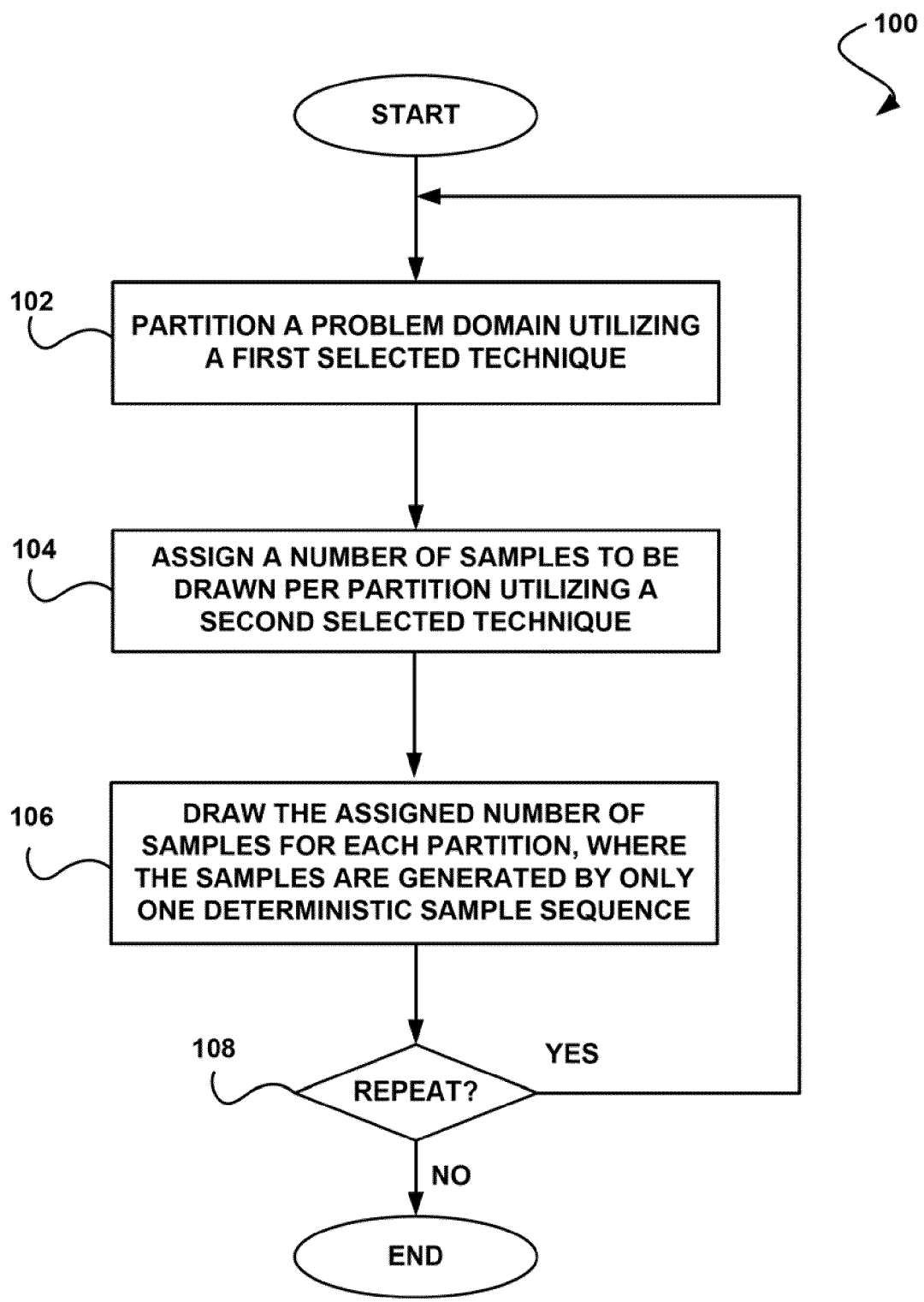
FIG. 1 shows a method for focusing computing power to a region of interest that can be changed interactively and arbitrarily during the process of image synthesis, in accordance with one embodiment.

FIG. 1 shows a method 100 for focusing computing power to a region of interest that can be changed interactively and arbitrarily during the process of image synthesis, in accordance with one embodiment. As shown, a problem domain is partitioned utilizing a first selected technique. See operation 102.

Additionally, a number of samples to be drawn per partition is assigned utilizing a second selected technique. See operation 104. Furthermore, the assigned number of samples are drawn for each partition, where the samples are generated by only one deterministic sample sequence. See operation 106.

As an option, the partitioning, assigning, and drawing may be repeated, such that existing partitions and assignments remain unchanged. See operation 108. In this case, the repeating may be used to adapt convergence speed without compromising convergence in at least one of a sequential computing environment or parallel computing environment.

In one embodiment, functionals defined on the problem domain may be approximated by averaging function values depending on the samples. Furthermore, a counter per functional or a counter per partition may be provided, which may be used to enumerate the samples associated with a functional.

It should be noted that, in various embodiments, the deterministic sample sequence may be a highly uniform point sequence including utilizing a low discrepancy sequence such as a Halton-sequence, a generalized Halton sequence, a (t, s)-sequence, or a rank-1 lattice sequence. As an option, the sample sequence may be a randomized version of one of a Halton-sequence, a generalized Halton sequence, a (t, s)-sequence, or a rank-1 lattice sequence. In either case, random or pseudo-random samples may be used. For example, at least one of random or pseudo-random samples may be used to enumerate the samples associated with a functional.

In various embodiments, the partitioning of the problem domain may be performed by on demand interactively partitioning the problem domain or automatically partitioning the problem domain. Furthermore, users may be permitted to interactively specify regions of interest. In this case, interactively specifying regions of interest may define a partition. The regions of interest may be capable of being changed interactively without compromising convergence.

In one embodiment, a partition may be represented as a hierarchy. Such hierarchy may be determined by using at least one of an empirical variance or difference of maxima and minima. Furthermore, the number of samples per partition may be determined by the size of a partition.

It should be noted that, in one embodiment, each functional to be computed may be assigned a set of positive numbers by using a third selected technique. In this case, a discrete probability density may be computed from the set of positive numbers by normalization. Additionally, the discrete density may be simulated using a highly uniform point sequence, including utilizing a low discrepancy sequence.

As an option, a sample may be drawn for each functional that has been chosen by transforming a sample of the highly uniform point sequence. It should be noted that, pixels of a screen may be considered as functionals and a partition may be determined by partitioning the set of pixels according to SIMD execution width, including a width of one. In this case, an initial computation phase (e.g. a path tracing phase, etc.) may be used to determine a discrete probability density on the sets of the partition.

As an option, the discrete probability density may be simulated using contiguous chunks of a highly uniform point sequence, including low discrepancy point sequences. Each partition that has been chosen may be marked by transforming a sample of the highly uniform point sequence. Further, counting may be performed to determine how often each partition has been chosen by transforming a sample of the highly uniform point sequence. As an option, one sample may be drawn for each marked partition, or the number of samples indicated by the counter per partition may be drawn to simulate transport paths for image synthesis.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
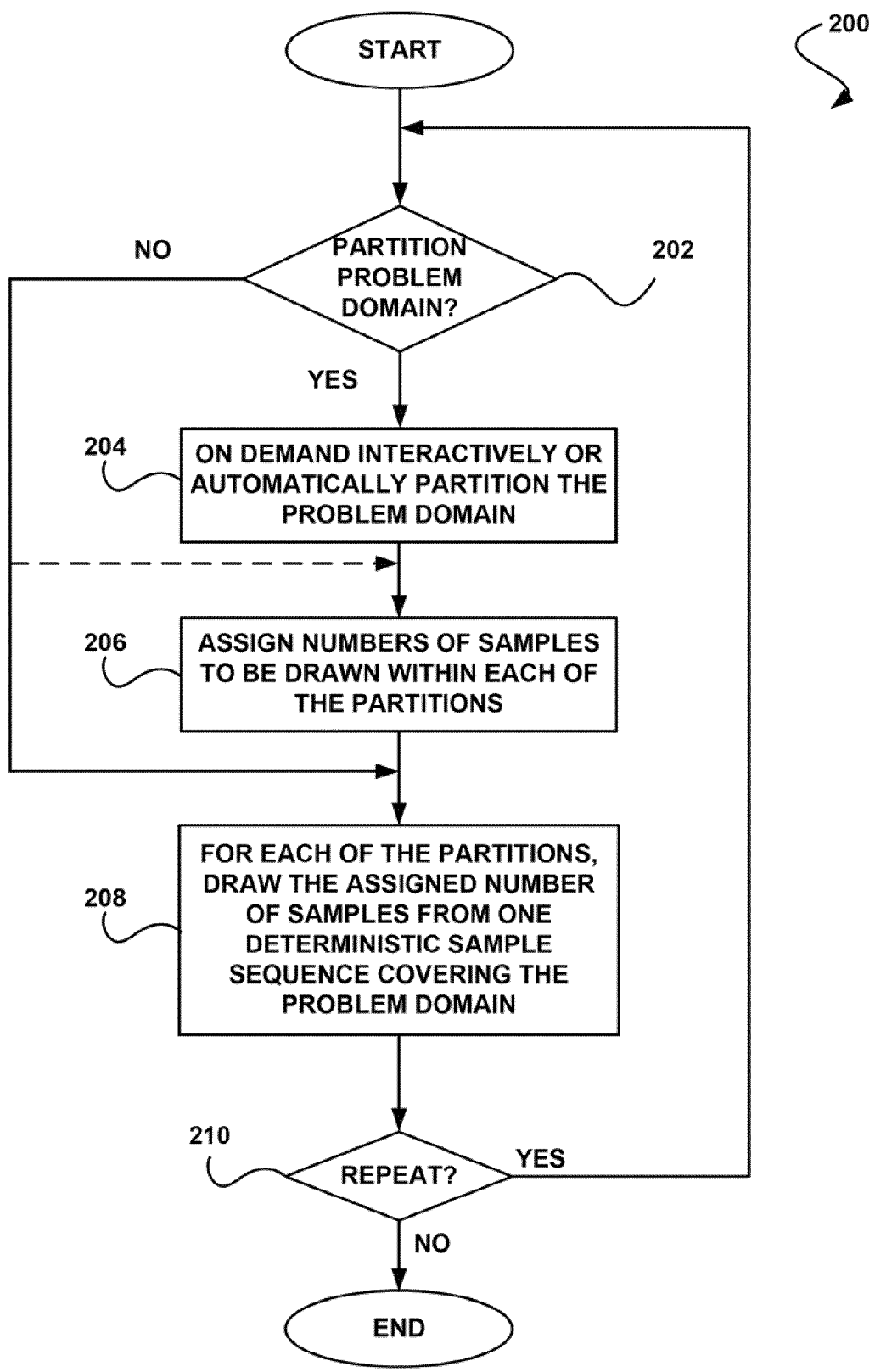
FIG. 2 shows a method to direct computing power to a region of interest, in accordance with one embodiment.

FIG. 2 shows method 200 to direct computing power to a region of interest, in accordance with one embodiment. As an option, the present method 200 may be implemented in the context of the functionality of FIG. 1. Of course, however, the method 200 may be carried out in any desired environment. It should also be noted that the aforementioned definitions may apply during the present description.

As shown, it is determined whether to partition a problem domain. See operation 202. If it is determined to partition the problem domain, the problem domain is on demand interactively or automatically partitioned. See operation 204. Furthermore, numbers of samples to be drawn within each of the partitions are assigned. See operation 206.

Then, for each of the partitions, the assigned number of samples are drawn from one deterministic sample sequence covering the problem domain. See operation 208. As an option, the operations are repeated. See operation 210. In one embodiment, the partitioning operation 204 may be skipped, as indicated by the dashed line, if it is determined not to partition the problem domain. As another option, both the assigning and partitioning may be skipped.

It should be noted that the method 200 may be used in the context of image synthesis and, in particular for sampling. As opposed to currently available approaches, the present method allows one to interactively change the region of interest without compromising the convergence. In fact, the convergence of an underlying sampling process is guaranteed at all times and can be interrupted and continued at all times. This is very convenient for a user as it allows for early inspection of regions of interest as well as adjusting the speed of sampling locally to achieve an overall uniform sampling quality. As a result, better simulation results can be obtained faster.

It is known that adaptively terminated sampling can arbitrarily fail. Unlike previous approaches, the present method introduces an adaptive sampling scheme that is consistent and therefore is guaranteed to converge on the vector space of square integrable functions.

In one embodiment, the present method may improve over previous adaptive sampling schemes (e.g. recursive stratified sampling, etc.) by enabling the use of deterministic hierarchical consistent sampling. Some previous approaches had to use randomized quasi-Monte Carlo methods, while the present method uses deterministic highly uniform point sequences and sets, which allows for simple parallelization and perfect reproducibility of the results without sacrificing convergence speed.

In what follows, it is assumed that someone skilled in the art is acquainted with rendering techniques such as all variants of path tracing, ambient occlusion, the principles of image synthesis using ray tracing, as well as the principles of Monte Carlo and quasi-Monte Carlo methods.

A proof for the convergence of quasi-Monte Carlo integro-approximation for square integrable functions (i.e. the function space $L_2$) has been shown and is known in the art. The adaptive integro-approximation algorithm in previous implementations used a lookup table to generate points of the Halton sequence in voxels implied by the $(M, \mu)$-uniformity property of the Halton sequence. Previously, the algorithms to enumerate certain quasi-Monte Carlo point sequences in voxels have been extended to (t, s)-sequences. In addition, the need for lookup tables has been removed or the required size has been dramatically reduced.

More information regarding enumerating quasi-Monte Carlo point sequences in voxels may be found in U.S. patent application Ser. No. 12/241,928, filed Sep. 30, 2008, titled "COMPUTER GRAPHICS WITH ENUMERATING QMC SEQUENCES IN VOXELS," which is incorporated herein by reference.

For one anti-aliasing application in a previous work (A. Keller, *Myths of computer graphics*, Monte Carlo and Quasi-Monte Carlo Methods 2004 (H. Niederreiter, ed.), Springer, 2006, pp. 217-243), the first two dimensions of a low discrepancy sequence are scaled such that the voxels implied by the $(M, \mu)$-uniformity property of the Halton sequence match the pixels on the screen. Each pixel maintains a single counter to enumerate the contiguous sequence of samples per pixel. A termination criterion per pixel is used to stop sampling. While this algorithm is deterministic and therefore easy to parallelize and reproducible, it is not guaranteed to converge due to the use of adaptive termination.

The aspects of the method 200 are based on a change of paradigm. One purpose of adaptive termination is to increase efficiency by devoting more effort to difficult parts of a problem as compared to the simple parts. This in turn means to schedule more work in regions of slow convergence speed and less in regions of faster convergence speed. Thus, instead of adaptively terminating the sampling process, the speed of sampling may be adjusted.

Such algorithms may be realized by partitioning the sampling domain into voxels according to the stratification properties of low discrepancy point sequences and maintaining a sample counter for each voxel of the partition. Sampling speed may be arbitrarily adjusted by using a selected method to decide how many samples to draw at a time per voxel. Such an algorithm is guaranteed to converge, because the contiguous streams of samples enumerated per voxel are the samples of the underlying low discrepancy sequence that fall into such a voxel and consequently are of low discrepancy too.

Similarly to adaptive termination, more samples are concentrated in regions of interest. However, adaptation may not be achieved by termination, but by assigning higher sampling speed, which avoids a termination condition. It should be noted that the sampling process converges unconditionally and especially independent of how sampling speed is determined, which offers a much wider choice of possibilities such as in selecting a precise error based termination criterion. For example, speed may be updated by user interaction during sampling or determined in an automatic way by focusing on screen bounding boxes or contours of moving objects.

As an option, randomization techniques used in the field of randomized quasi-Monte Carlo methods may be applied in order to randomize the above mentioned algorithms. Also, it should be noted that it is always possible to replace quasi-random samples by random or pseudo-random samples. However, this may not be the case for replacing random or pseudo-random samples by quasi-random samples.

Figure 3:
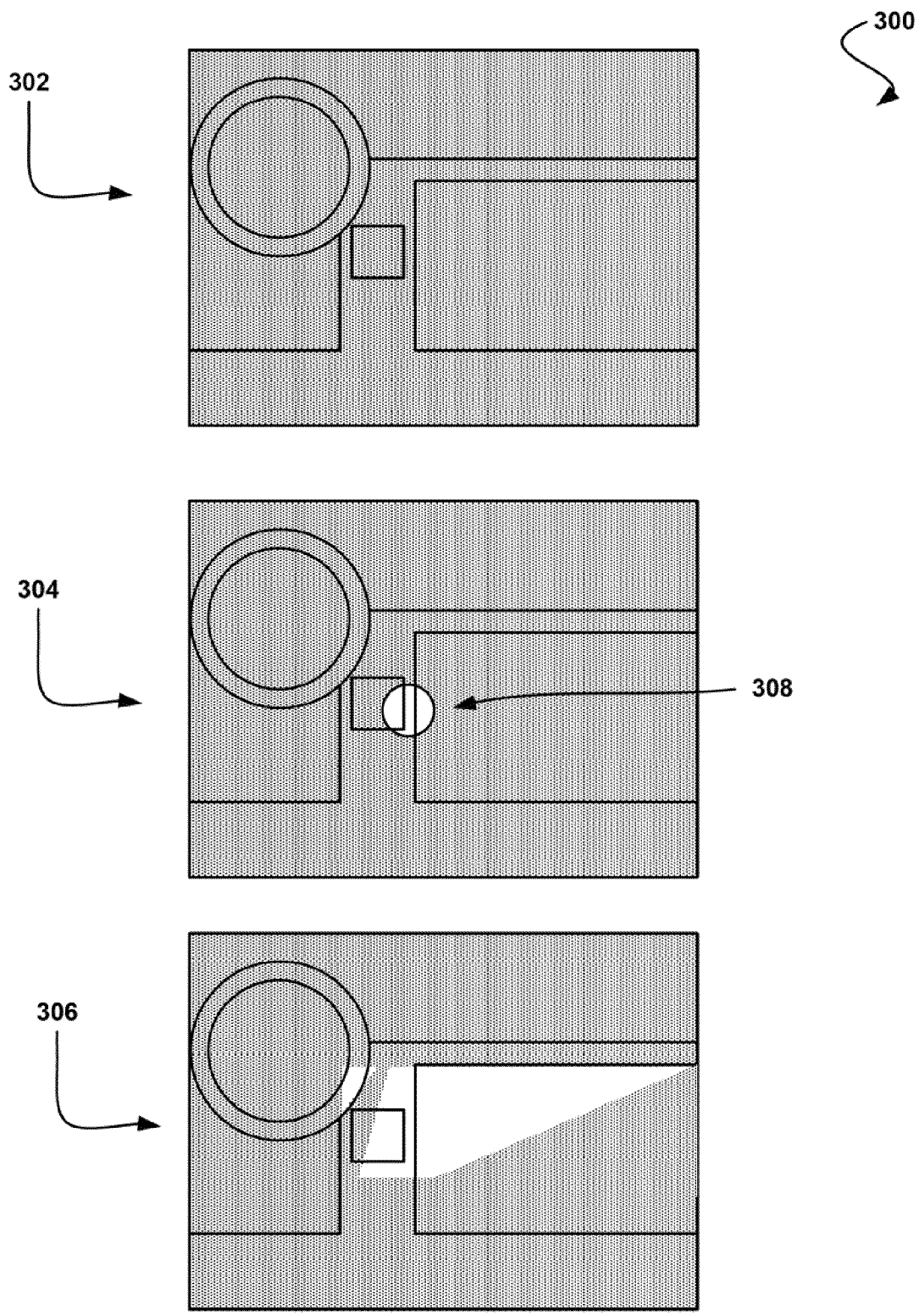
FIG. 3 shows a sample brush implementation, in accordance with one embodiment.

In one embodiment, the user can specify a region of interest on the screen during rendering. This may be referred to a "sample brush." FIG. 3 shows a sample brush implementation 300, in accordance with one embodiment. As an option, the sample brush implementation 300 may be implemented in the context of the functionality of FIGS. 1-2. Of course, however, the sample brush implementation 300 may be implemented in any desired environment. Again, the aforementioned definitions may apply during the present description.

In the sample brush implementation 300, image 302 shows an intermediate shot of an image synthesis application, which uses quasi-Monte Carlo integro-approximation. Image 304 shows a circular region 308 that is selected for refinement. In this case, all compute power is directed towards that region, which is notably more refined than the image outside the region. Image 306 illustrates that the sample brush has been used to refine more regions of the image. As before, these regions expose a much reduced noise level. It should be noted that the image synthesis process will converge no matter what regions are refined.

As shown, in one embodiment, the region of interest may be interactively specified as a circular region 308 of a selected radius around the mouse pointer or a position specified by an eye tracker. In this case, on demand new samples are only drawn for pixels inside the region of interest.

In one embodiment, program threads on a GPU that sample light transport paths may be associated to a pixel. Each thread may test whether it is inside the region of interest and has to trace a light transport path or terminate otherwise. The counter representing the number of samples already drawn for that specific pixel is only incremented if the pixel is inside the region of interest and a light transport path has been sampled and its contribution has been accumulated.

While the number of samples drawn per pixel can vary from pixel to pixel, all pixels will converge, since the algorithm is consistent (i.e. consistent in a mathematical sense). This is true since a continuous stream of vectors of a low discrepancy sequence is consumed by each pixel. In addition, this allows a user to turn on and off arbitrary regions of interest during image synthesis in a parallel computing environment without compromising the final result.

In one embodiment, samples and, in turn, compute power may be concentrated in regions painted in a way a paint brush is used in a drawing program. At any time, the user may refine regions of interest by concentrating the compute power, while image synthesis is reliably continued in a consistent way.

Another application of the methods described herein is adaptive sampling speed control. In this case, one sample counter per functional to be computed is stored with the current approximation of that functional. Using a selected technique, the set of functionals is then partitioned and each partition is assigned a number of samples to be enumerated. In contrast to previous implementations, changing the partition even during sampling does not affect convergence, because for each functional a contiguous stream of samples of a highly uniform point sequence including a low discrepancy sequence is enumerated.

Some partitioning schemes may allow for using only one sample counter per region instead of one counter for each functional. In one embodiment, the partition may be a hierarchical partition of the sampling domain. Using a selected technique, this partition, as well as the sampling speed, may be determined from an initial sampling of the domain and may be updated during sampling. Such a technique may include estimating the variance of the samples inside a partition or determining the difference of the maximum and minimum sampled value.

In one embodiment, the hierarchical partitioning may resemble recursive stratified sampling algorithms as the MISER algorithm, which has been extended to use elements of randomized quasi-Monte Carlo methods. However, instead of computing one functional using adaptive random sampling or adaptive pseudo-random sampling, one deterministic low discrepancy sequence may be used to compute a multitude of functionals with individual speed control. Unlike previous approaches, the algorithm unconditionally converges as long as samples are drawn.

In another embodiment, the algorithm may follow a hierarchical partitioning technique described in previous works (e.g. the hierarchical partitioning described in J. Hanika, H. Dammertz, and H. Lensch, *A hierarchical automatic stopping condition for Monte Carlo global illumination*, Technical report, Ulm University, 2009). However, instead of applying a hierarchical stopping condition, a sampling speed may be determined for each set of the partition and samples are enumerated using the aforementioned techniques.

It should be noted that the approaches described above resemble multi-pass algorithms, where the number of samples is determined for each set of a partition before actually drawing the samples. In some cases, this procedure may be too coarse for applications that require much smaller chunks of work, for example, in order to allow for interactivity or parallelization by job distribution. Sample by sample sampling with speed control again is based on previous findings, where for each functional to compute, a sample counter is used to enumerate the samples of a highly uniform point sequence including a low discrepancy sequence associated with that functional.

After the speed per functional has been determined, the speed can be represented as a probability density over the sampling domain simply by normalizing. This probability density now can be used for hierarchical sample warping. The sample by sample sampling process now maps successive samples of a second low discrepancy sequence to the problem sampling domain using hierarchical sample warping. As a result, each warped sample of the second low discrepancy sequence identifies for which functional the next sample has to be drawn.

Alternatively, the samples of the second low discrepancy sequence can be mapped by inverting a discrete probability distribution. It should be noted that, in contrast to some previous implementations, the warped samples are not used for the actual sampling process, but indicate for which functional the sampling process has to be triggered.

The method described above is deterministic and therefore easily can be parallelized by distributing work on a sample by sample basis or in chunks of samples from the second low discrepancy sequence. Since low discrepancy sequences are dense in the real numbers, all functionals are guaranteed to be repeatedly updated, which in turn guarantees convergence independent of the used probability density, as long as this probability density is positive.

In another embodiment, the previously described framework may be applied for the realization of efficient path tracing on architectures that use SIMD instructions and latency hiding by hardware scheduling of groups of threads. A hardware realization of such architectures may include current GPU technology, where the groups of threads are named warps and each warp is executed using SIMD instructions.

The warp execution model defines a partition of the set of pixels. For each set of the partition a Boolean flag is maintained. Executing only warps with this flag set to true enables sampling speed control or concentrating compute power to regions of interest.

One low discrepancy sequence and a counter per pixel may be utilized to enumerate the points of the low discrepancy sequence associated with that pixel. In the context of quasi-Monte Carlo path tracing, this means that two dimensions of a low discrepancy sequence are used to identify a pixel, while the remaining components determine the remaining decisions along a light path like for example selecting scattering directions or virtual point light source positions.

More information regarding identifying a pixel using two dimensions of a low discrepancy sequence may be found in U.S. patent application Ser. No. 12/241,928, filed Sep. 30, 2008, titled "COMPUTER GRAPHICS WITH ENUMERATING QMC SEQUENCES IN VOXELS," which has been incorporated herein by reference.

In one embodiment, only one counter per set of the partition may be used as each partition executes an identical number of paths simultaneously. This, however, may exclude the combination of the technique of the sample brush implementation.

In order to control sampling speed, several variables are stored per pixel. Besides the accumulated pixel color and the sample counter n, two luminance values $b_0$, $b_1$ and the path length $l_p$ are accumulated. Whenever a sample for a pixel is requested, the associated vector from the low discrepancy sequence is uniquely identified by the sample counter and the pixel position. One dimension of this vector is used, to decide whether the luminance of the simulated light transport path is accumulated in either $b_0$ or $b_1$.

More information regarding identifying the buffer $b_0$ or $b_1$ may be found in U.S. patent application Ser. No. 12/432,498 filed Apr. 29, 2009, titled "System, Method, And Computer Program Product For Decomposing A Sampling Task Into A Plurality Of Jobs," which is incorporated herein by reference.

This allows the computation of the heuristic shown in Expression 1 per pixel, and this value to be averaged for all pixels in one set of the partition. If Expression 1 equals to zero, it may be set to a value greater zero to ensure the positiveness.

$$\frac{((b_0 - b_1)/n)^2 \cdot (l_p/n - (1-\varepsilon))}{\max\{(b_0+b_1)/n, \varepsilon'\}} \qquad \text{Expression 1}$$

This heuristic value is large in regions of high contrast by the difference of the luminances and grows with path length. In this case, $\varepsilon$ is a small number to ensure a certain sampling in regions of very short paths and $\varepsilon'$ avoids divisions by zero in dark regions.

The ensemble of the values of this heuristic can be interpreted as a discrete probability density. Using the standard approach of a binary search to simulate this discrete probability density, uniform samples of a low discrepancy sequence can be transformed such that the transformed samples reference a set of the pixel partition with a density proportional to that defined by the heuristic.

The speed controlled rendering algorithm works as described below. An initial phase runs without adaption (i.e. the flag of each warp is set to true so that each warp always executes). As a result, a selected number of frames is accumulated as well as the two luminance values and the path length per pixel. After this initialization, all warp flags are set to false and the heuristic is evaluated in order to determine the discrete probability density. A selected number of contiguous samples from the radical inverse in base 2 is used to simulate this probability density. The transformed samples represent indices of sets of the pixel partition and thus it is easy to mark the corresponding warp flag as true. The next frame is then accumulated, where only warps with their flag set true are executed. The rendering loop continues by repeating the heuristic evaluation and accumulation.

The algorithm is converging as long as the probability density is positive and the samples from the low discrepancy sequence are extracted in contiguous blocks without leaping, as this guarantees denseness on the set of real numbers. Instead of using only a flag per warp, an integer value per warp can be used. During the simulation of the discrete probability density this variable is incremented, whenever a warp is referenced. Using the aforementioned heuristic, these counters have larger values in regions of slower convergence. While accumulating a frame, each warp is executed as often as indicated by its counter.

In one embodiment, one of the luminance buffers can be replaced by computing the luminance of the accumulated pixel color and subtracting the remaining luminance value. The described technology works for all SIMD widths including the width of one. It should be noted that the algorithm is converging for any positive probability and such for any heuristic that results in a positive probability density.

Figure 4:
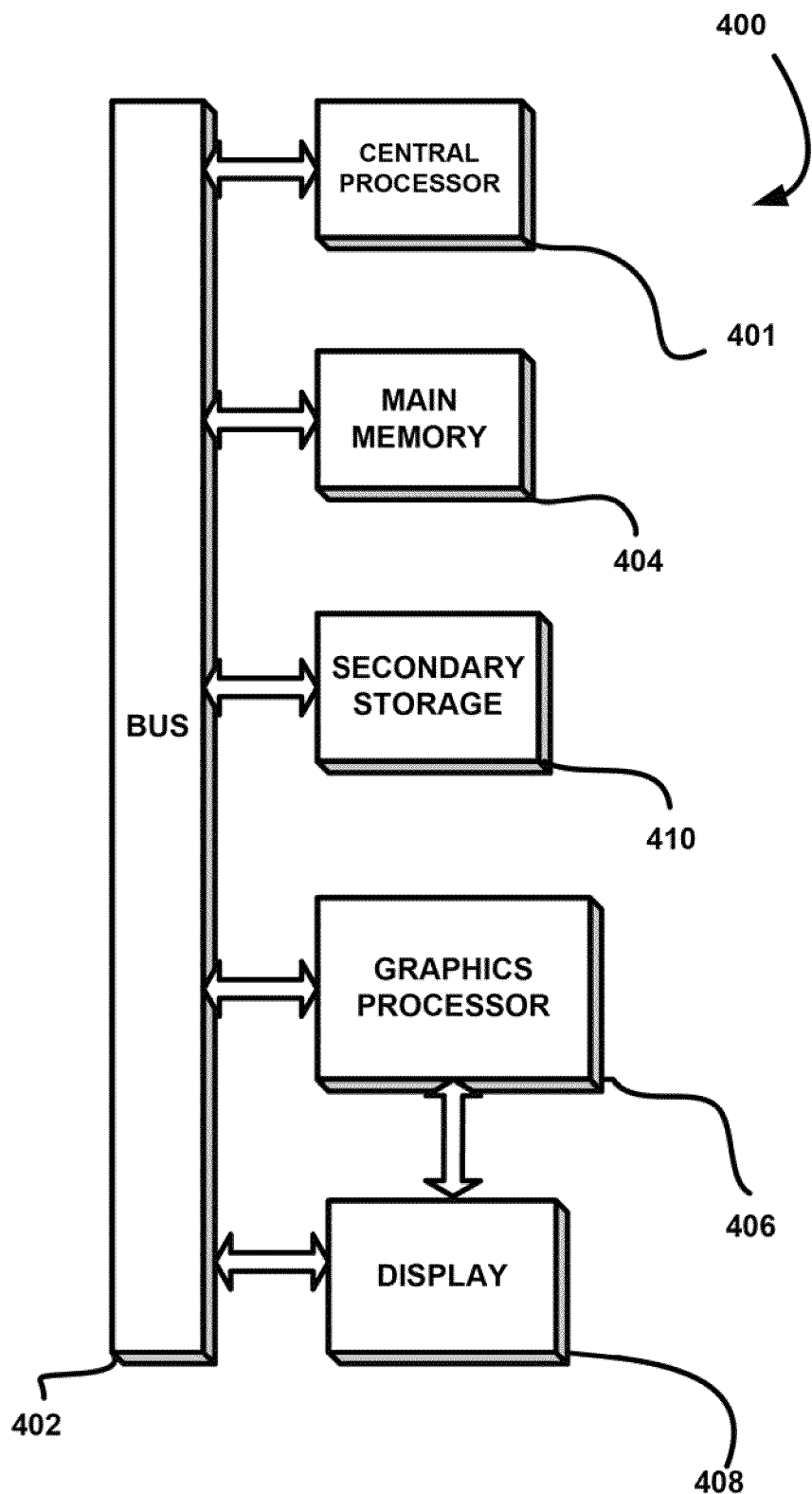
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU). Similarly, in one embodiment, the foregoing modules may be situated on a semiconductor platform like an FPGA and/or other reconfigurable device. As an option, these devices may be in-socket devices.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    partitioning a problem domain utilizing a first selected technique;
    assigning a number of samples to be drawn per partition of the partitioned problem domain utilizing a second selected technique; and
    drawing the assigned number of samples for each partition of the partitioned problem domain, where the samples are generated by only one deterministic sample sequence;
    wherein the partitioning, assigning, and drawing are capable of being repeated such that existing partitions and assignments are capable of remaining unchanged during sampling and a convergence speed is adapted without compromising convergence in at least one of a sequential computing environment or a parallel computing environment.

2. The method of claim 1, wherein functionals defined on the problem domain are approximated by averaging function values depending on the samples.

3. The method of claim 2, further comprising at least one of a counter per functional or a counter per partition, which is used to enumerate the samples associated with a functional.

4. The method of claim 3, wherein the deterministic sample sequence is one of a highly uniform point sequence, a low discrepancy sequence, a Halton-sequence, a generalized Halton sequence, a (t, s)-sequence, or a rank-1 lattice sequence.

5. The method of claim 3, wherein the sample sequence is a randomized version of one of a Halton-sequence, a generalized Halton sequence, a (t, s)-sequence, or a rank-1 lattice sequence.

6. The method of claim 3, wherein at least one of random or pseudo-random samples are used.

7. The method of claim 3, wherein at least one of random or pseudo-random samples are used to enumerate the samples associated with a set of a partition.

8. The method of claim 1, wherein the partitioning of the problem domain is performed by at least one of on demand interactively partitioning the problem domain or automatically partitioning the problem domain.

9. The method of claim 8, wherein users are permitted to interactively specify regions of interest.

10. The method of claim 9, wherein one of the users interactively specifies a region of interest, and in response to the user specifying the region of interest, a number of samples to be drawn per partition within the region of interest is increased by assigning a higher sampling speed to the region of interest specified by the user.

11. The method of claim 10, wherein, in response to the interactive specification of the region of interest by the user, a thread of a graphics processing unit (GPU) tests whether it is inside the region of interest specified by the user, wherein the thread is for sampling at least one light transport path and is associated with at least one pixel, such that when the thread determines that it is inside the region of interest, a counter representing a number of samples already drawn for the at least one pixel is only incremented if the pixel is inside the region of interest and the light transport path has been sampled and its contribution has been accumulated.

12. The method of claim 9, wherein interactively specifying regions of interest defines a partition.

13. The method of claim 12, wherein the regions of interest are capable of being changed interactively without compromising convergence.

14. The method of claim 1, wherein a partition is represented as a hierarchy.

15. The method of claim 14, wherein the hierarchy is determined by using at least one of an estimated variance of the samples of the partition, or a difference between a maximum and a minimum sampled value.

16. The method of claim 1, wherein the number of samples per partition is determined by a size of the partition.

17. The method of claim 1, wherein each of one or more functionals to be computed is assigned a set of positive numbers by using a third selected technique.

18. The method of claim 17, wherein a discrete probability density is computed from the set of positive numbers by normalization.

19. The method of claim 18, wherein the discrete probability density is simulated using a highly uniform point sequence, including utilizing a low discrepancy sequence.

20. The method of claim 19, wherein a sample is drawn for each functional that has been chosen by transforming a sample of the highly uniform point sequence.

21. The method of claim 20, wherein a set of pixels of a screen are considered as functionals and a partition is determined by partitioning the set of pixels according to SIMD execution width.

22. The method of claim 21, wherein an initial computation phase is used to determine a discrete probability density on sets of the partition.

23. The method of claim 22, wherein the discrete probability density is simulated using contiguous chunks of the highly uniform point sequence, including the low discrepancy point sequence.

24. The method of claim 23, further comprising at least one of marking each partition that has been chosen by transforming a sample of the highly uniform point sequence, or counting how often each partition has been chosen by transforming a sample of the highly uniform point sequence.

25. The method of claim 24, further comprising performing at least one of drawing one sample for each marked partition, or drawing a number of samples indicated by a counter per partition.

26. The method of claim 24, further comprising performing at least one of drawing one sample for each marked partition, or drawing a number of samples indicated by a counter per partition to simulate transport paths for image synthesis.

27. A computer program product embodied on a non-transitory computer readable medium, comprising:
    computer code for partitioning a problem domain utilizing a first selected technique;

computer code for assigning a number of samples to be drawn per partition of the partitioned problem domain utilizing a second selected technique; and computer code for drawing the assigned number of samples for each partition of the partitioned problem domain, where the samples are generated by only one deterministic sample sequence;

wherein the partitioning, assigning, and drawing are capable of being repeated such that existing partitions and assignments are capable of remaining unchanged during sampling and a convergence speed is adapted without compromising convergence in at least one of a sequential computing environment or a parallel computing environment.

28. An apparatus, comprising:

a processor for:
- partitioning a problem domain utilizing a first selected technique;
- assigning a number of samples to be drawn per partition of the partitioned problem domain utilizing a second selected technique; and
- drawing the assigned number of samples for each partition of the partitioned problem domain, where the samples are generated by only one deterministic sample sequence;

wherein the partitioning, assigning, and drawing are capable of being repeated such that existing partitions and assignments are capable of remaining unchanged during sampling and a convergence speed is adapted without compromising convergence in at least one of a sequential computing environment or a parallel computing environment.

* * * * *

UNITED STATES PATENT AND TRADEMARK OFFICE
CERTIFICATE OF CORRECTION

PATENT NO. : 8,558,835 B2
APPLICATION NO. : 12/512782
DATED : October 15, 2013
INVENTOR(S) : Keller et al.

Page 1 of 1

It is certified that error appears in the above-identified patent and that said Letters Patent is hereby corrected as shown below:

On the Title Page:
Item (73) Assignee; please replace "NVIDA Corporation" with --NVIDIA Corporation--.

Signed and Sealed this
Twenty-fifth Day of November, 2014

Michelle K. Lee
*Deputy Director of the United States Patent and Trademark Office*